United States Patent [19]

Secci

[11] Patent Number: 5,150,770

[45] Date of Patent: Sep. 29, 1992

[54] RECHARGE DEVICE, PARTICULARLY FOR DRIVE MECHANISMS FOR EXTENDING AND WITHDRAWING OPERATIVE MEMBERS OF A SPACE VEHICLE

[75] Inventor: Giovanni Secci, Rome, Italy

[73] Assignee: Contraves Italiana S.p.A., Rome, Italy

[21] Appl. No.: 697,074

[22] Filed: May 8, 1991

[30] Foreign Application Priority Data

Jan. 25, 1991 [EP] European Pat. Off. ............ 91830022

[51] Int. Cl.$^5$ ..................... F03G 1/08; G05G 17/00
[52] U.S. Cl. ...................................... 185/40 R; 74/2; 192/82 T; 192/67 R; 244/158 R; 244/173
[58] Field of Search ............... 185/39, 40 R; 74/2; 192/82 T, 67 R; 244/158 R, 173

[56] References Cited

U.S. PATENT DOCUMENTS 3,113,639 12/1963 Koplar et al. ................. 185/40 R
4,290,393 9/1981 Hart et al. ..................... 192/82 T X
4,561,529 12/1985 McIntosh ....................... 192/82 T X
4,596,310 6/1986 Hatakeyama et al. ............ 185/40 R
4,831,893 5/1989 Obama et al. .................. 192/82 T X
4,884,464 12/1989 Grattarola et al. .................. 74/2 X

FOREIGN PATENT DOCUMENTS 45250 2/1982 European Pat. Off. .
60-233377 11/1985 Japan .
2-120912 5/1990 Japan .

Primary Examiner—Allan D. Herrmann
Attorney, Agent, or Firm—R. Neil Sudol; Henry D. Coleman

[57] ABSTRACT

In a spring operated mechanism, the recharge device (1) is adapted to wind the spring (4) during idle times when the drive mechanism (4,16) is not operating. The recharge device has a lever member (48,50) operated by a shape memory alloy member (46) and adapted to turn a gear (8,26) for winding the spring.

8 Claims, 3 Drawing Sheets

RECHARGE DEVICE, PARTICULARLY FOR DRIVE MECHANISMS FOR EXTENDING AND WITHDRAWING OPERATIVE MEMBERS OF A SPACE VEHICLE

BACKGROUND OF THE INVENTION

1. Field of the Invention

The present invention relates to a recharge device, particularly for spring operated drive mechanisms for extending and withdrawing operative members of a space vehicle.

2. Description of the Prior Art

Space vehicles require deployment devices adapted to unfold an operative member (such as an antenna or a probe, etc.) when they have reached their operational orbit, and also to fold it back when necessary. Former types of deployment devices were based on spring operated mechanisms, designed for "one-shot" operation, and therefore unsuited for modern requirements. Deployment devices comprising electrically operated motors were therefore designed in order to extend and withdraw an operative member several times during the life of the space vehicle. The electrically driven devices, though, are heavy, require a complex design and structure, and are not as reliable as the spring operated mechanisms.

This same Applicant designed a spring operated mechanism which combined the advantages of simplicity and reliability of "one-shot" mechanisms and the multifunctional capability of electrically operated one.

This type of mechanism, also known by the acronym DARM (Deployment And Retraction Mechanism), has been disclosed in U.S. Pat. No. 4,884,464, filed by this same Applicant, and substantially operates by drawing entirely on the elastic energy stored in a helical spring. Therefore, this mechanism can only carry out a limited number of manoeuvres (deployment and retraction) according to the maximum energy stored in the spring.

This fact greatly limits the performance of the DARM of the prior art and also limits its advantages over the more traditional electrically driven deployment mechanisms.

The aim of the present invention is to eliminate the disadvantages described above in the DARMs and in the spring operated mechanisms of the known art.

SUMMARY OF THE INVENTION

The above aim, as well as these and other objects that will be more apparent later, are achieved by a recharge device, particularly for spring operated drive mechanisms for extending and withdrawing operative members of a space vehicle, comprising a frame having a spring means, said spring means being connected to a shaft, said shaft having a winding direction of rotation and an unwinding direction of rotation, in said unwinding direction of rotation said shaft turning for operating a drive mechanism under the action of sad spring means, in said winding direction of rotation said shaft being turned to wind and recharge said spring means, characterized in that it comprises at least one actuator having a shape memory alloy member adapted to rotate said shaft in said winding direction of rotation for recharging said spring means.

BRIEF DESCRIPTION OF THE DRAWINGS

Further characteristics and advantages of the invention will be more apparent by the following description of an embodiment of the invention, illustrated, by way of example in the enclosed drawings in which.

DESCRIPTION OF THE PREFERRED EMBODIMENTS OF THE INVENTION

Figure 1:
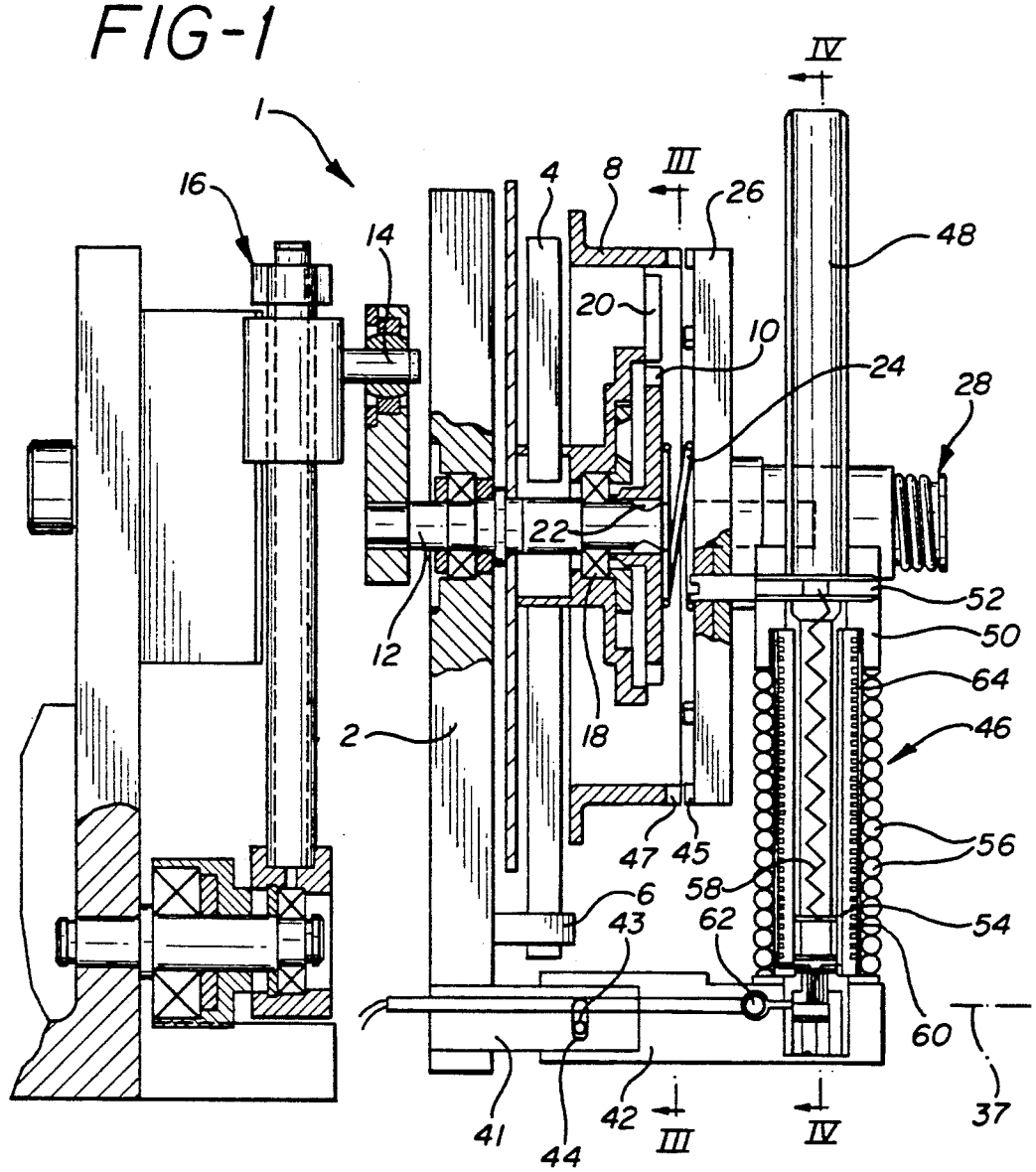
FIG. 1 is a side section view of the device according to the invention.

With reference to the drawings, a driving mechanism 16 includes a recharge device, generally designated by the reference numeral 1, which comprises a frame 2 supporting a spiral spring 4, having one end 6 fixed to the frame and the other end fixed to a first front toothed wheel 8 associated with a shaft, or axle, 12.

In a per se known manner, as, for example, illustrated in U.S. Pat. No. 4,884,464, spiral spring 4 is adapted to unwind and therefore to rotate shaft 12, which operates the driving mechanism 16.

A ratchet wheel 10 is keyed to shaft 12, to engage wheel 8 when motion has to be transmitted from the spiral spring to shaft 12 and to prevent the first wheel 8 from turning clockwise under the action of the spiral spring, when shaft 12 is still and the spiral spring is wound, or recharged, as explained hereinafter. Spring 4 can wind (recharge) in a clockwise direction, with reference to FIGS. 3 and 4.

Figure 3:
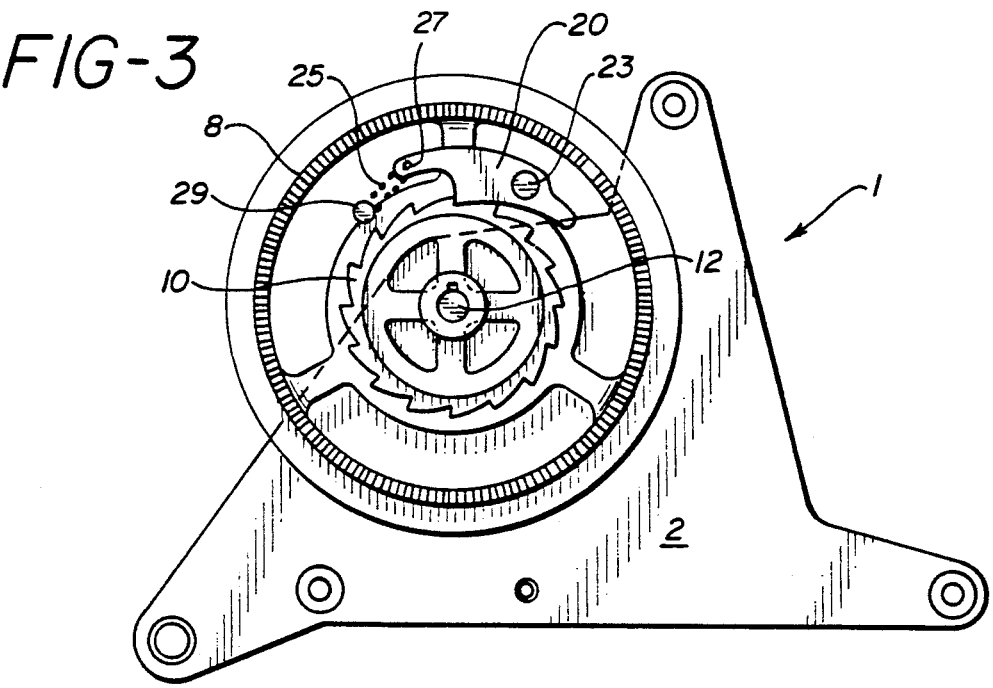
FIG. 3 is a sectional front view according to the line III—III of FIG. 1.
Figure 4:
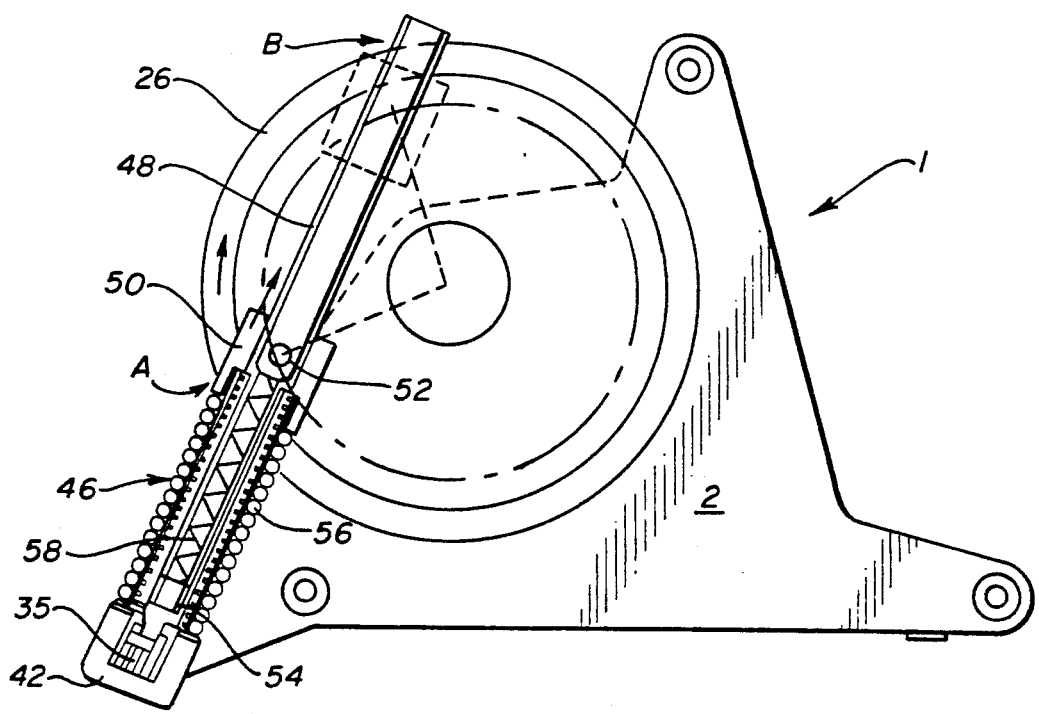
FIG. 4 is a partially sectional front view, according to the line IV—IV of FIG. 1.
Figure 5:
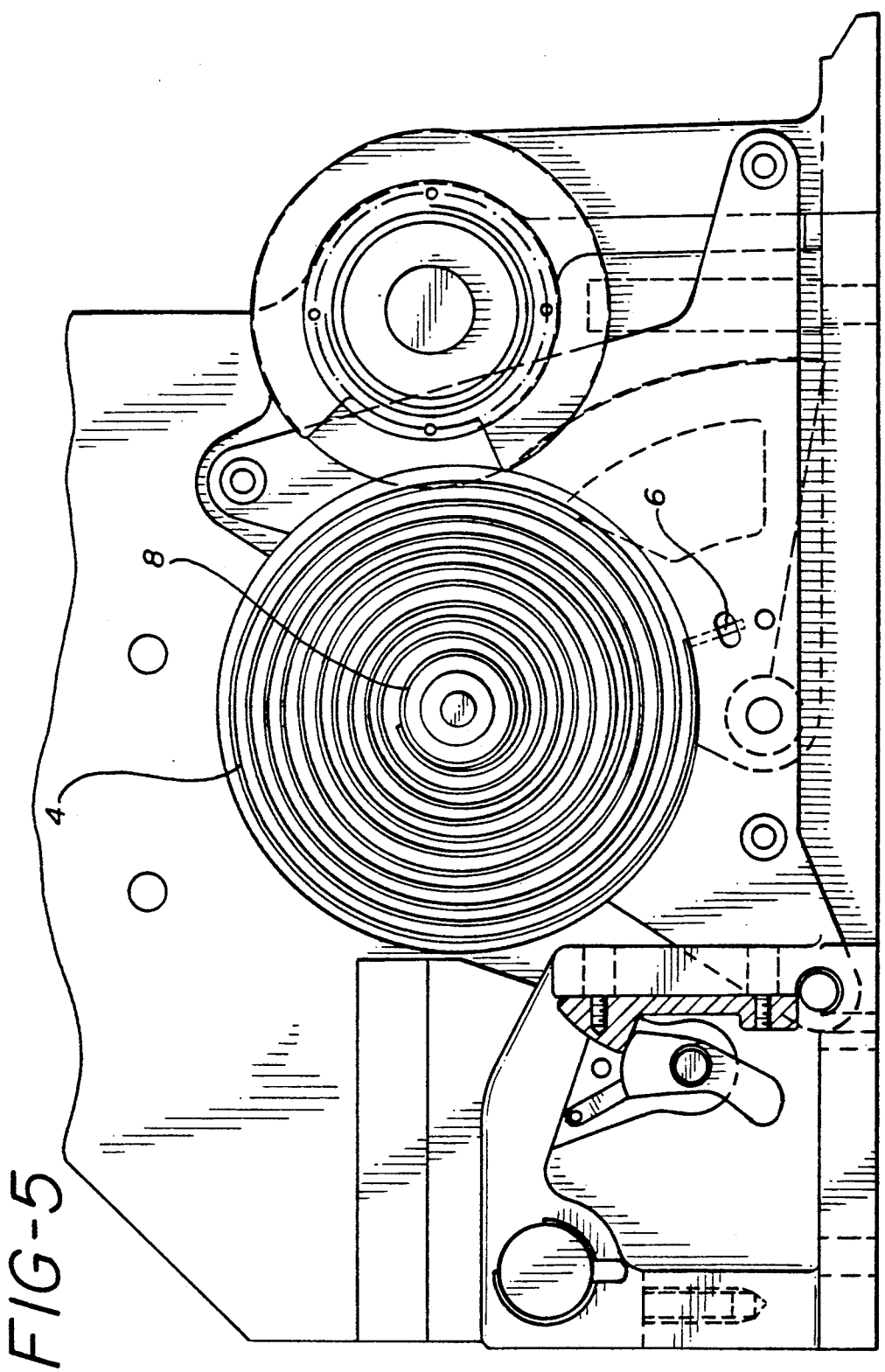
FIG. 5 is a sectional view of the spiral spring.

First wheel 8 is mounted idle on shaft 12, by means, for example, of a ball bearing 18 and is adapted to recharge spiral spring 4 by letting ratchet 20 run on ratchet wheel 10 associated with the shaft by means of keys 22. As illustrated in FIG. 3, rachet 20 is pivotably fixed to wheel 8 by a first pin 23. A rachet biasing spring 25 extends from a second pin 27 on rachet 20 to a third pin 29 connected to wheel 8.

A pin 41 is associated with frame 2 and supports a support member 42 adapted to rotate idle on pin 41, by a limited angle set by the slot 44. To this purpose, an adapted grub screw 43 is fixed to the support member 42 and inserted into slot 44.

A linear actuator 46 is pivoted at 35 to the support member 42 for rotation about an axis 37 and comprises a rod 48 and a slide 50 adapted to slide along rod 48. Slider 50 is pivotably connected to a second wheel 26 by means of a pin 52 so that, by sliding upward (with reference to FIG. 4) along rod 48, slider 50 makes the second wheel 26 rotate clockwise.

Linear actuator 46 comprises a heater 54 arranged between rod 48 and a Shape Memory Alloy spring 56 adapted to actuate slider 50 when heated by heater 54. A tension spring 58 is associated with the lower end of the rod 48 and with slider 52. Heater 54, as illustrated in the drawings, for example comprises two PTFE shells 60 mounted on rod 48 and having resistance coils made of Constantan wire connected to an electric terminal 62. The assembly is inserted into a copper pipe 64, on which the SMA spring runs during the heating and cooling stages.

The second front toothed wheel 26 is kept at a set distance from first wheel 8 by a spring 24 which biases second wheel 26 against an engagement means 28 associated with shaft 12.

The engagement means, comprises a second linear actuator and is adapted to engage the first toothed wheel with second wheel 26. The engagement means comprises a bush 30 slidably mounted on shaft 12 which has a ball bearing 32 on which a second shaft 34 is idle. Bush 30 presses wheel 26 by means of a SMA (Shape Memory Alloy) spring 36, which is adjusted by the limit stop disk 38, fastened by a nut 40. A heater 39 s arranged between second shaft 34 and spring 36. When the SMA spring 36 is heated the spring coil dilates and therefore bush 30 pushes the second front toothed wheel 26 to engage first wheel 8.

Figure 2:
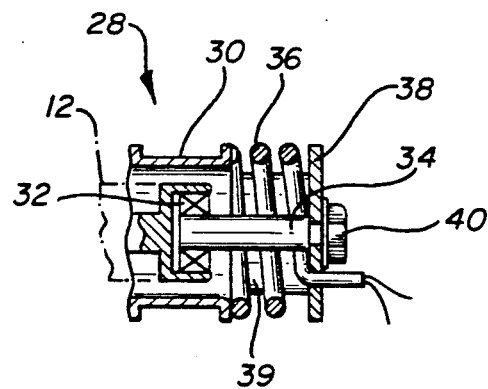
FIG. 2 is an enlarged view of a detail of FIG. 1.

The operation of the recharge device is as follows. Heater 39 heats SMA spring 36 which dilates and pushes bush 30 leftward (with reference to FIG. 2). Bush 30 in turn pushes the second front toothed wheel 26 so that clutch teeth 45 of wheel 26 engage clutch teeth 47 of the first front toothed wheel 8. Although the second wheel is thus engaged, it is idle on its shaft and exerts friction on bush 30.

Heater 54 heats SMA spring 56, of the second linear actuator 46, and slider 50 slides upwards (from position A to position B of FIG. 4) turning second wheel 26, and therefore first wheel 8, clockwise, thereby winding, or recharging, spiral spring 4. Ratchet wheel 10 is still during recharging, being keyed to shaft 6, while ratchet 20, which is associated with first wheel 8, runs clockwise on the ratchet wheel.

When heaters 39 and 54 cool off, of first and second linear actuators 28 and 46 respectively, bush 30 moves to the right, biased by spring 24, and slider 50 returns to position A, biased by spring 58. During this step (when wheels 8 and 26 are disengaged) ratchet wheel 10 and ratchet 20 prevent second wheel 8 from turning counterclockwise thereby unwinding the spiral spring 4.

By repeating this operation, spiral spring 4 is recharged and, when deployment is required, it can be discharged (unwound) letting shaft 12 free to rotate. Spring 4 therefore turns the first wheel counterclockwise, wheel 8 acts on ratchet wheel 10 which, being keyed to shaft 12, rotates shaft 12 thereby activating hinge mechanism 16.

The recharge device can guarantee a recharge motion (from position A to position B) of about 80° per cycle. Since, in the illustrated case, the DARM spiral spring has a preloading of 1400°, i.e. about four complete turns, it will of course be necessary to activate the RM (Recharge Mechanism) several times in order to obtain a complete recharge of the spring. The spiral spring 4 does not have to be completely unwound to be recharged again; in fact, it can be recharged in any position it reaches between 0° and 1400° and, in this way, the consecutive recharging cycles can be reduced.

It has been seen n practice how the recharge mechanism, according to the invention, achieves the intended aim and objects by using shape memory alloys, which enable thermal energy to be converted into mechanical energy, with a good F/d ratio; where F (N) represents the thrust force produced during the change of material force, and d (mm) represents the displacement. Of course, both F and d can only be calculated on the basis of the alloy storage temperature, which in turn depends on the thermal range in which both the DARM and the RM must operate.

The device according to the invention may have numerous modifications and variations, all within the inventive concept; furthermore, all the details may be substituted with technically equivalent elements.

The materials employed, as well as the dimensions, may be any according to the specific needs and the state of the art.

Where technical features mentioned in any claim are followed by reference signs, those reference signs have been included for the sole purpose of increasing the intelligibility of the claims and accordingly, such reference signs do not have any limiting effect on the scope of each element identified by way of example by such reference signs.

I claim:

1. Recharge device, particularly for spring operated drive mechanism for extending and withdrawing operative members of a space vehicle, comprising a frame having a spring means, said spring means being connected to a shaft, said shaft having an unwinding direction of rotation, in said unwinding direction of rotation said shaft turning for operating a drive mechanism under the action of said spring means, a wheel member having a winding direction of rotation being turned to wind and recharge said spring means, the device further comprising at least one actuator having a shape memory alloy member adapted to rotate said wheel member in said winding direction of rotation for recharging said spring means.

2. Device, according to claim 1, wherein said least one actuator comprises a rod, a slider member adapted to slide along said rod, a shape memory alloy member, a heater means adapted to heat said shape memory alloy member, a pin member pivotably connecting said slider member with a wheel member associated with said spring means, said rod having an end pivoted to said frame, said shape memory alloy member being adapted to move said slider member along said rod thereby rotating said wheel member in said winding direction of rotation.

3. Device, according to claim 2, wherein said at least one actuator comprises a second spring adapted to retract said slider member.

4. Device, according to claim 1, wherein said spring means is a spiral spring, further comprising a first toothed wheel associated with said shaft and idle thereon, and a ratchet wheel keyed to said shaft, a ratchet member being pivoted to said first toothed wheel and being adapted to engage said ratchet wheel, said spiral spring having a first end connected to said frame and a second end connected to said first toothed wheel, said first toothed wheel being adapted to turn in said winding direction of rotation while said ratchet wheel and said shaft remain still, said first toothed wheel being adapted to turn in said unwinding direction of rotation, under the action of said spiral spring, and to engage said ratchet wheel turning said shaft for operating said drive mechanism.

5. Device, according to claim 4, wherein said wheel member it comprises a second toothed wheel mounted idle on said shaft, a bush mounted coaxially on said shaft at said second wheel, a second shaft mounted idle and coaxially to said shaft by means of a bearing, a limit stop disk, a second shape memory alloy member arranged between said bush and said disk, a second heater means arranged at said second shape memory alloy member and adapted to heat said alloy member, said second wheel being normally arranged at a distance from said first wheel by means of a second spring means arranged between said ratchet wheel and said second wheel, said second shape memory alloy member being adapted to extend said bush to push said second wheel into engagement with said first wheel.

6. A recharging device, particularly for spring operated drive mechanisms for extending and withdrawing operative members of a space vehicle, comprising:
 a frame;
 a shaft rotatably mounted to said frame;
 spring means operatively connected to said shaft for turning said shaft in a first direction of rotation to operate a drive mechanism;
 rewinding means operatively coupled to said spring means for winding and recharging said spring means, said rewinding means including at least one actuator having a shape memory alloy member.

7. The recharging device according to claim 6 wherein said rewinding means further includes a wheel member operatively connected to said shape memory alloy member.

8. The recharging device according to claim 7 wherein said actuator further includes a rod pivotably connected to said frame, a slider member slidably mounted to said rod, heating means for heating said shape memory alloy member, first coupling means for pivotably connecting said slider member to said wheel member, and second coupling means for operatively connecting said wheel member to said spring means, said shape memory alloy member being operatively connected to said slider member to move said slider member along said rod and to thereby move said wheel member to rewind said spring means.

* * * * *